United States Patent [19]

Hague et al.

[11] 3,773,083

[45] Nov. 20, 1973

[54] HYDRAULIC CONTROL APPARATUS

[75] Inventors: Robert Z. Hague, Oradell, N.J.;
Edwin F. Hantman, New York, N.Y.

[73] Assignee: Kemp Industries, Inc., West Milford, N.J.

[22] Filed: Mar. 28, 1972

[21] Appl. No.: 238,879

[52] U.S. Cl. .......................................... 137/625.69
[51] Int. Cl. ............................................. F16k 11/07
[58] Field of Search .................... 137/625.69, 625.6, 137/625.66, 625.61

[56] References Cited
UNITED STATES PATENTS

| | | | |
|---|---|---|---|
| 3,160,174 | 12/1964 | Schmiel et al. | 137/625.69 X |
| 3,563,272 | 2/1971 | Mercier | 137/625.69 X |
| 3,106,065 | 10/1963 | Stacey | 137/625.69 X |
| 3,209,782 | 10/1965 | Wolpin et al. | 137/625.69 X |

*Primary Examiner*—Henry T. Klinksiek
*Assistant Examiner*—Robert J. Miller
*Attorney*—Thomas W. Kennedy

[57] ABSTRACT

A hydraulic control apparatus for a hydraulic motor including, an isolator valve, first and second motor lines for connecting said isolator valve to a pressure source, third and fourth motor lines for connecting said isolator valve to said motor, said isolator valve comprising, a valve casing having an elongate chamber having an axis, and a spool assembly received in said chamber coaxially therewith, said spool assembly including, an elongate spool member having axially opposite end faces, first spring means disposed in bearing against one end face, and second spring means disposed in bearing against the opposite end face.

6 Claims, 9 Drawing Figures

HYDRAULIC CONTROL APPARATUS

The present invention relates to a hydraulic control apparatus, and particularly to a hydraulic control apparatus having an isolation valve.

A conventional hydraulic control apparatus includes a hydraulic motor, a control valve, and first and second lines connecting the valve to the motor. A conventional control valve, such as a spool valve, includes a cylinder having an elongate cavity, a spool piece disposed in said cavity forming two axially displaceable chambers respectively connected to said first line and said second line, a first pair of pressure and return lines for providing forward flow through said chambers, a second pair of pressure and return lines for providing reverse flow through said chambers, said spool piece having raised portions defining said chambers and being axially movable to regulate the direction and rate of flow to the motor through one of said pairs of pressure and return lines.

One problem with the conventional hydraulic control apparatus is that relatively long first and second lines between the control valve and the motor prevent a relatively smooth startup of the motor at a relatively low speed because the elongate columns of fluid in the first and second lines act like spring members thereby causing a chugging or stepping effect in the motor. For example, the motor rotor will halt momentarily at about every half turn.

In accordance with one embodiment of the present invention, the stepping effect in the motor during startup at a relatively low speed is eliminated by using a novel isolator valve which is connected into the first and second lines near the motor.

Accordingly, it is one object of the present invention to provide a hydraulic control apparatus, including a hydraulic motor, a control valve, and relatively long first and second interconnecting lines, wherein the stepping effect in the motor during startup at a relatively low speed is substantially eliminated.

It is another object of the present invention to provide isolating means for the motor of the hydraulic control apparatus according to the aforementioned object, wherein the isolating means controls the rate of fluid flow through the motor.

To the fulfillment of these and other objects, the invention provides a hydraulic control apparatus for a hydraulic motor including, an isolator valve, first and second motor lines for connecting said isolator valve to a pressure source, third and fourth lines for connecting said isolator valve to said motor, said isolator valve comprising, a valve casing having an elongate chamber having an axis, and a spool assembly received in said chamber coaxially therewith, said spool assembly including, an elongate spool member having axially opposite end faces, first spring means disposed in bearing against one end face, and second spring means disposed in bearing against the opposite end face.

Further objects of the present invention will become apparent upon reading the following description when taken with the drawings, wherein like parts are designated by like numerals throughout the several views, and wherein.

Figure 1:
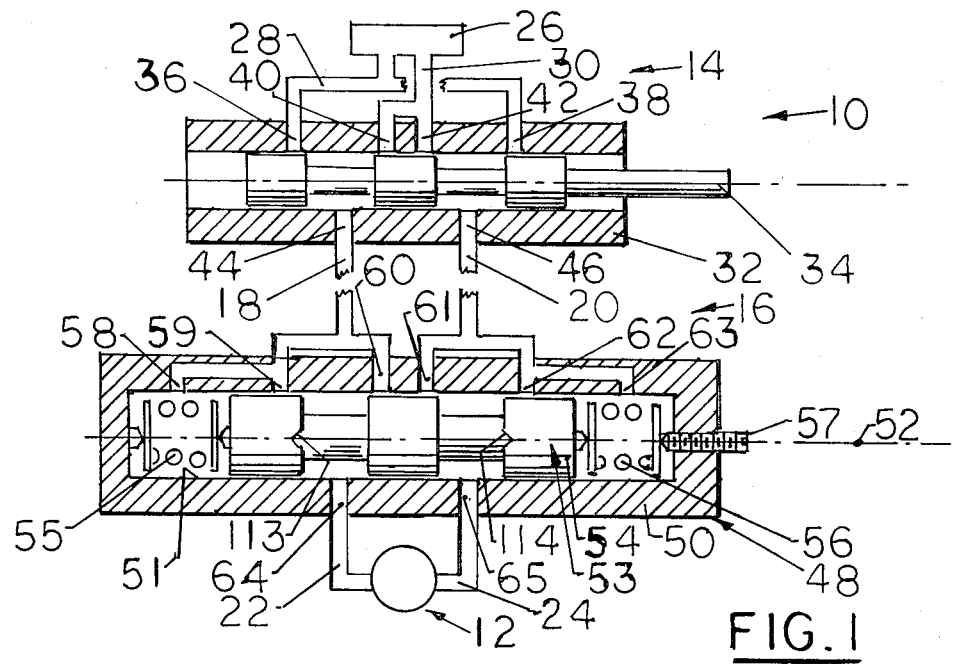
FIG. 1 is a schematic view of a hydraulic control apparatus embodying features of the present invention.
Figure 3:
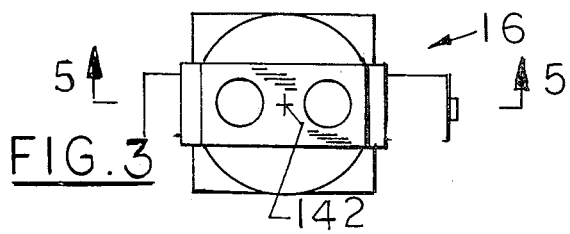
FIG. 3 is a sectional view as taken along the line 3—3 of FIG. 2.
Figure 2:
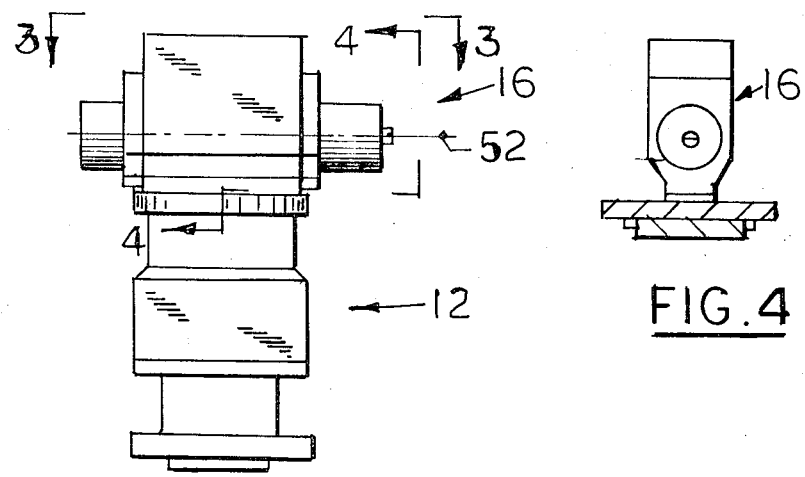
FIG. 2 is an elevation view of an isolator valve and hydraulic motor of the above apparatus.
Figure 4:
FIG. 4 is a sectional view as taken along the line 4—4 of FIG. 2.

Referring to FIG. 1, one embodiment of the present invention is a hydraulic control apparatus 10. Apparatus 10 includes a hydraulic motor 12, a control valve 14, an isolator valve 16, first and second motor lines 18, 20, which connect control valve 14 to isolator valve 16. Apparatus also includes third and fourth motor lines 22, 24, which connect isolator valve 16 to motor 12, a source of pressure 26, and a pressure line 28 and return line 30, which connect source 26 to control valve 14.

Control valve 14 (FIG. 1) has an elongate cylinder 32 and a control piece 34, which is disposed in cylinder 32. Cylinder 32 has a first pressure port 36 and a second pressure port 38, both of which connect to pressure line 28. Cylinder 32 has a first return port 40, and a second return por 42, both of which connect to return line 30. Cylinder 32 also has first and second motor line ports 44, 46, which respectively connect to first and second motor lines 18, 20. Control piece 34, on moving to the left in FIG. 1, opens only first pressure port 36 and second return port 42 for forward flow. Control piece 34, on moving to the right, alternately opens first return port 40 and second pressure port 38 for reverse flow.

Isolator valve 16 (FIG. 1) includes a valve casing 48, which has an elongate sleeve or bore portion 50 that has an elongate bore 51 with an axis 52. Valve 16 also includes a spool assembly 53, which is disposed in sleeve 50 coaxially therewith. Spool assembly 53 includes an elongate spool member 54, which is received in bore 51, and a first spring unit 55, which bears against one end of spool 54. Spool assembly also includes a second spring unit 56, which bears against the other end of spool 54, and an adjustor 57, which bears against second spring unit 56.

Sleeve 50 has three upper ports 58,59,60, which connect to first motor line 18. Sleeve 50 also has three other upper ports 61,62,63, which connect to second motor line 20. The ports 58,59,60,61,62,63, have a selective arrangement relative to spool member 54, as explained hereafter. Sleeve 50 has one lower port 64, which connects to third line 22, and has one other lower port 65, which connects to fourth line 24. Ports 64,65 have a selective arrangement relative to spool member 54, as explained hereafter.

In operation, movement of control piece 34 to the left, as shown in FIG. 1, opens only first pressure port 36 and second return port 42 to provide forward or counterclockwise flow through first motor line 18 to isolator valve ports 58,59,60. The pressure drop between ports 58 and 63 causes a movement to the right of spool 54. Such movement opens ports 60,62 thereby allowing flow in a counterclockwise direction through third motor line 22, thence through motor 12, and thence through fourth motor line 24. The flow then passes through port 62 to second motor line 20. Thereafter, the flow passes successively through port 46, cylinder 32, port 42, return line 30 to source 26. Because of the symmetrical design of each of the valves 14,16, movemnt of control piece 34 to the right causes flow in the opposite or clockwise direction thereby providing a reverse drive of motor 12. The construction of isolator valve 16 is now explained hereafter in more detail.

Figure 5:
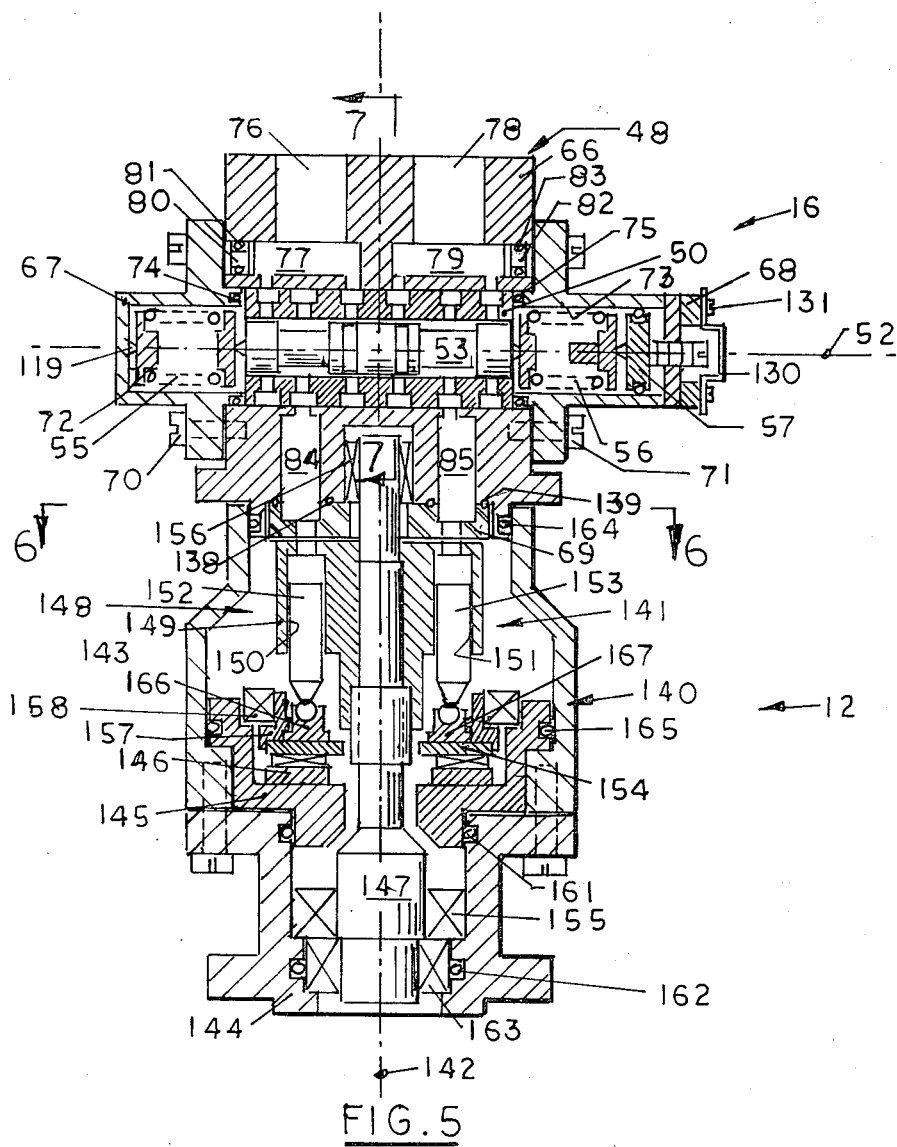
FIG. 5 is a sectional view as taken along the line 5—5 of FIG. 3.

Isolator valve casing 48 (FIG. 5) includes a vlave body 66, a first end cap 67 at one end of body 66, a port plate 69 below body 66. Caps 67,68 are respectively connected to valve body 66 by a plurality of screw members 70,71. First cap 67 has a first recess 72, which receives first spring unit 55. Second cap 68 has a second recess 73, which receives second spring unit 56 and adjustor 57. Caps 67,68 have respective O- rings 74,75, which bear against valve body 66.

Valve body 66 (FIG. 5) includes a first passage 76 and a first cavity 77, which connects to first line 18. Valve body 66 also includes a second passage 78 and a second cavity 79, which connects to second line 20. First cavity 77 is closed at one end by a first plug 80, which has an O-ring 81. Second cavity 79 is also closed by a second plug 82, which has an O-ring 83. Valve body 68 includes a passage 84, which forms most of third line 22. Port 64 of third line 22 is formed in sleeve 50. Valve body 66 also includes a passage 85, which forms most of fourth line 24. Port 65 of fourth line 24 is also formed in sleeve 50.

Figure 8:
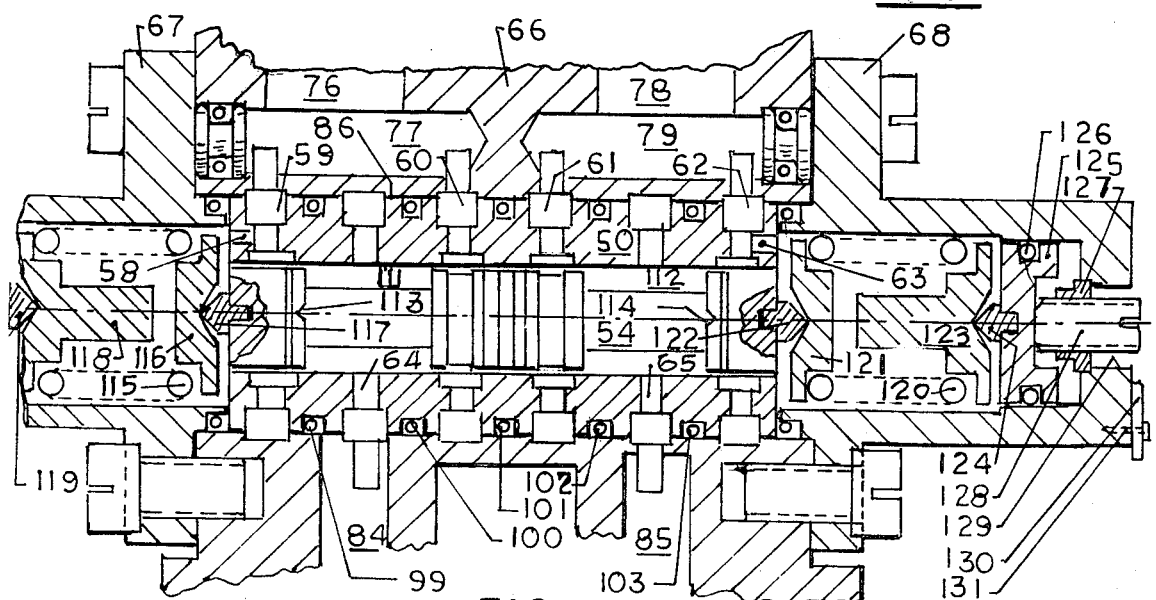
FIG. 8 is a sectional view of the sleeve portion of FIG. 5.
Figure 9:
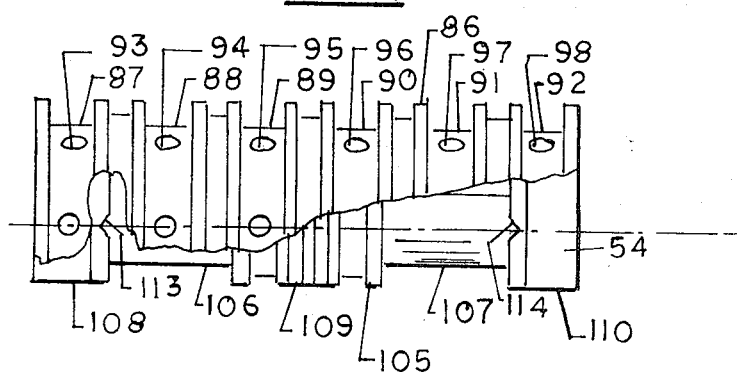
FIG. 9 is an enlarged view of the spool portion of FIG. 5.

Sleeve 50 (FIG. 8), which is a cylindrical, hollow member, has an outer surface 86, which has a plurality of annular grooves 87,88,89,90,91,92, which have respective radial holes 93,94,95,96,97,98, for forming ports 58,59,60,61,62,63,64,65. Outer surface 86 also has a plurality of annular seal rings 99,100,101,102,103, which prevent leakage between adjacent grooves 87,88,89,90,91,92.

Spool member 54, which is axially movable, has a radial outer surface 105 having left and right axially spaced annular grooves 106,107, which separate a left end raised portion 108, which controls flow through port 59, a center raised portion 109, which controls flow through ports 60,61, and a right end raised portion 110, which controls flow through port 62. Grooves 106,107 face the inner surface of sleeve 50 forming a pair of annular passages 111,112, which are axially movable by moving spool 54. Left end raised portion 108 has on its axially inner side a radial groove 113 for seepage during reverse flow initially into port 59. Right end raised portion 110 has a similar radial groove 114 for slight flow or seepage during forward flow into port 62, as explained hereafter.

First spring unit 55 includes a coil spring 115, an inner spring seat 116 with a pivot pin 117, and an outer spring seat 118 with a pivot pin 119. Second spring unit 56 also includes a coil spring 120, an inner spring seat 121 with a pivot pin 122, and an outer spring seat 123 with a pivot pin 124.

Adjustor 57 includes a movable plate 125, which has a seal ring 126 that engages recess 73, a fixed plate 127, which is fastened to second end cap 68, and an adjusting screw 128, which is threaded into fixed plate 127, for adjustably positioning movable plate 125 relative to end cap 68 for varying the compression forces in coil springs 115,120. End cap 68 has an opening 129 in the end thereof for access to adjusting screw 128 from the exterior of end cap 68. End cap 68 has a removable cover plate 130, which covers adjusting screw 128. Cover plate 130 has connector screws 131 for ease of removal thereof.

Figure 6:
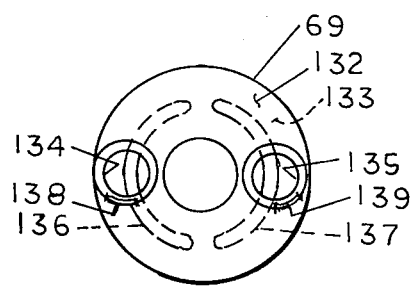
FIG. 6 is a sectional view as taken along the line 6—6 of FIG. 5.
Figure 7:
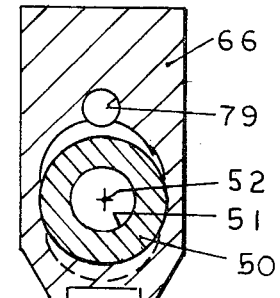
FIG. 7 is a sectional view as taken along the line 7—7 of FIG. 5.

Port plate 69 (FIG. 6), which is disposed between isolator valve 16 and motor 12, has an upper surface 132 and a lower surface 133. Upper surface 132 has a left hole 134 and a right hole 135. Lower surface 133 has a left slot 136, which connects to passage 84 through hole 134 and has a right slot 137, which connects to passage 85 through hole 135. Slots 136, 137 have substantially semi-circular profiles, and have substantially equal radii. Port plate 69 also has a left seal ring 138 for sealing left hole 134, and has a right seal ring 139 for sealing right hole 135. Rings 138,139 bear against valve body 66.

Motor 12 (FIG. 5), which is connected to and is disposed below isolator valve 16, includes a housing 140, and a rotating assembly 141, which are coaxial about a vertical axis 142. Housing 140 includes a peripheral wall 143, a bottom wall 144, which is fixedly connected to peripheral wall 143, and a bearing or cam retainer wall 145, which is connected to bottom wall 144. Bearing wall 145 has a bearing surface 145, which slopes at a slight angle, such as about 20° to the horizontal, from the rear edge to the front edge thereof.

Rotating assembly 141, which rotates about axis 142, includes a shaft 147 and a drive unit 148. Drive unit 148 includes a rotor 149, which is connected to shaft 147, a plurality of bore portions 150,151, which are formed in rotor 149, a plurality of pistons 152,153, which are respectively disposed in bore portions 150,151, and a thrust race unit 154, which is rotated by the downward forces applied thereon by typical pistons 152,153, through typical shoes 166 and 167. Shaft 147 has a bottom bearing 155, which is supported by bottom wall 144, and has a top bearing 156, which is supported by isolator valve 16.

Thrust race unit 154 has a shoe retainer 157, which bears against a radial bearing 158, that is supported by bearing wall 145. Thrust race unit 154 is supported by bearing wall 145. Thrust race unit 154 bears against bearing wall 145 to permit rotation of rotor 149 due to the downward forces applied by pistons 152,153.

Motor bottom wall 144 has an upper seal ring 161, which is disposed adjacent to bearing wall 145, and has a lower seal ring 162, which surrounds an annular member 163, which engages shaft 147. Peripheral wall 143 has an upper seal ring 164, which is disposed adjacent to isolator valve 16, and has a lower seal ring 165, which is disposed adjacent to bearing wall 45 for sealing the construction joints therebetween.

In operation, isolator valve 16 acts as a spring-centered four-way spool valve, as shown in FIG. 1. Supply lines 18 and 20 from the control valve 14 connect to ports 58, 59 and 60 and to 61,62 and 63 respectively. Displacement of the spool 54 to the left interconnects control valve lines 18 and 20 to motor lines 22 and 24 through ports 61 and 59. Motion of the spool 54 to the right connects motor lines 20 and 18 to lines 24 and 22 through ports 60 and 62. Ports 58 and 63 connect to lines 18 and 20 respectively at all times. When the spool 54 is in midposition, valve ports 59 and 62 and 60 and 61 are closed.

When fluid is introduced to line 18 from the control valve 14, pressure enters the spool end cavity through 58 causing a pressure differential across the spool 54 and driving the spool 54 to the right. In one model of embodiment 10, when a differential of approximately 200 psi is reached, port 60 opens pressurizing line 22. The motor 12 does not turn due to there being no valve opening from line 24 to line 20. When a pressure differential between ports 58 and 63 of approximately 600 psi is reached port 62 opens slightly allowing fluid flow back to the control valve 14. Since the pressure differential applied across motor lines 22 and 24 exceeds that required to overcome internal motor friction, the motor 12 starts to turn in proportion to the rate of fluid flow. It is noted that the 600 psi differential which is required to drive motor 12 is across short lines 22 and 24 that have a relatively small compliance, or spring-like deflection. The return flow which passes through the restricted port 62 cannot have a rapid increase in fluid flow whereby the chugging or stepping effect in motor 12 is avoided. In addition, changes in pressure in lines 22 and 24 do not cause corresponding changes in the pressure differential across the isolator valve spool 54. The restriction of flow at port 62 on the downstream side of motor 12 causes the motor lines 22, 24 to be pressurized thereby causing a greater pressure in motor 12 and making motor 12 more responsive to change in fluid flow rate.

As the rate of fluid flow into line 18 is increased, the pressure in port 58 increases thereby moving spool 54 further to the right, opening port 62 and increasing motor velocity. The portion of spool 54 adjacenJ port 62 is shaped so that the valve opening is initially through a V-shaped radial slot 114, and then through a complete annular opening, thereby providing a closer control at a relatively low rate of motor speed and providing a relatively low head loss at a relatively high rate of motor speed.

Isolator valve 16, as shown in FIG. 1, has a symmetrical shape and design so that when the motor 12 is driven in the reverse or opposite direction, fluid from control valve 14 passes into line 20 thereby driving spool 54 to the left. In the above described model of embodiment 10, at approximately 200 psi (pounds per square inch) of differential pressure, port 61 opens, and at a differential of 600 psi, port 59 opens slightly thereby initiating motor operation.

The pressure differential which causes spool 54 to be driven off center is the combined pressure across ports 60 and 62 (or 61 and 59) and motor 12. Thus, as a resisting torque is applied to motor 12, isolator valve 16 opens, keeping the total pressure drop from line 20 to line 18 relatively constant. When a relatively high output torque of motor 12 is required, power loss through isolator valve 16 is relatively low. Thus, in operation, the use of isolator valve 16 improves relatively low speed motor operation when operating with long lines, but minimizes power loss during peak power demand of motor 12.

Control valve 14, isolator valve 16, and motor 12 form a symmetrical type of assembly. Final adjustment of the system symmetry is brought about by adjustment of adjusting screw 57 whereby valve cracks or starts to open at the same value of pressure differential when operated in either one of the opposite directions.

In summary, the present invention provides a hydraulic control apparatus, including a hydraulic motor, a control valve, and first and second interconnecting lines, wherein the chugging or stepping effect in the motor during startup at a relatively low speed is substantially eliminated, and wherein the pressure drop across the hydraulic motor can be maintained substantially constant regardless of motor speed.

While a particular embodiment of this invention has been described, modifications thereof will occur to those skilled in the art. For example, a reciprocating type of motor can be used in place of motor 12. It is intended that the following claims cover all such modifications.

What is claimed is:

1. A hydraulic control apparatus comprising,
   a valve casing having an elongate chamber having an axis, and
   a spool assembly received in said chamber coaxially therewith,
   said valve casing including,
   first and second lines for connecting said chamber to a pressure source, and
   third and fourth lines for connecting said chamber to a motor, and
   said spool assembly including,
   an elongate spool member having axially opposite first and second end faces,
   first spring means disposed in bearing against said first end face,
   second spring means disposed in bearing against said second end face, and
   adjusting means disposed within said chamber and arranged to adjust the nul! position of said spool assembly relative to said valve casing,
   said spool member having a pair of axially spaced annular grooves forming therebetween a center raised portion and forming a pair of opposite end raised portions disposed axially outwardly therefrom, each said end portion having an axially inner face having a radial groove, wherein said valve casing includes a valve body, a first end cap and a second end cap, said end caps connecting to axially opposite ends of said valve body, said valve body having an elongate sleeve member having an elongate bore portion, said sleeve member having first and second and third upper ports connecting to said first motor line, said sleeve member having fourth and fifth and sixth upper ports connecting to said second motor line, said sleeve member having a first lower port connecting to said thrid motor line and having a second lower port connecting to said fourth motor line, said first end cap having a recess facing one end of said elongate bore portion and said second end cap having a recess facing the other end of said elongate bore portion together forming said elongate chamber, said adjusting menas having an adjusting screw threaded into said second end cap and bearing against said spool assembly coaxially therewith.

2. The apparatus as claimed in claim 1, wherein said sleeve member has a radial outer surface and has a radial inner bore surface, said radial outer surface having a plurality of axially spaced annular grooves, said sleeve member having a plurality of axially spaced annular seal rings mounted on said outer surface, each said seal ring being disposed between a pair of adjacent annular grooves.

3. The apparatus as claimed in claim 2, wherein said axially spaced annular grooves include six annular grooves, each said annular groove having a plurality of peripherally spaced radial holes extending through said inner surface forming said upper and lower ports.

4. The apparatus as claimed in claim 3, wherein said valve body has a first passage connecting said first line to two of said upper ports, and wherein said valve body has a second passage connecting to two other ports of said upper ports.

5. The apparatus as claimed in claim 1, including a control valve, a pressure source, and a pressure line and return line connecting said control valve to said pressure source, said control valve comprising, an elongate cylinder having an axis, an elongate control piece disposed in said cylinder coaxially therewith, said cylinder having a first pressure port and a second pressure port connecting to said pressure line, said cylinder having a first return port and a second return port connecting to said return line, said cylinder having a first motor line port and a second motor line port respectively connecting to said first and second motor lines.

6. The apparatus as claimed in claim 5, wherein said isolator valve has a port plate, said port plate having an upper surface and a lower surface, said upper surface having a first hole connecting to said third motor line and having a second hole connecting to said fourth motor line, said lower surface having a first arcuate slot connecting to said first hole and having a second arcuate slot connecting to said second hole, said first and second arcuate slots having substantially equal radii.

* * * * *